United States Patent [19]

Mussman

[11] 4,354,062

[45] Oct. 12, 1982

[54] COMMUNICATION SYSTEM SIGNALING CIRCUIT

[75] Inventor: Harry E. Mussman, Glen Ellyn, Ill.

[73] Assignee: Bell Telephone Laboratories, Incorporated, Murray Hill, N.J.

[21] Appl. No.: 117,281

[22] Filed: Jan. 31, 1980

[51] Int. Cl.³ .................. H04M 1/76; H04M 19/02
[52] U.S. Cl. ......................... 179/84 A; 179/16 F; 179/18 HB; 179/18 J
[58] Field of Search ............ 179/18 HB, 18 FA, 18 J, 179/16 AA, 16 F, 51 AA, 84 A, 84 R, 84 SS, 86, 170.8, 170.2, 170 D, 70, 77

[56] References Cited

U.S. PATENT DOCUMENTS

| Re. 28,432 | 5/1975 | Ross | 330/207 |
|---|---|---|---|
| 2,990,516 | 6/1961 | Johannessen | 330/10 |
| 3,435,149 | 3/1969 | Inose et al. | 179/18 J |
| 3,579,132 | 5/1971 | Ross | 330/10 |
| 3,829,788 | 8/1974 | Ford | 330/10 |
| 3,870,826 | 3/1975 | Carbrey et al. | 370/110 |
| 3,904,831 | 9/1975 | Pommerening et al. | 179/18 GF |
| 3,931,581 | 1/1976 | Kush et al. | 330/10 |
| 4,016,501 | 4/1977 | Jasinski et al. | 330/10 |
| 4,031,338 | 6/1977 | Campanella et al. | 179/170.8 |
| 4,057,695 | 11/1977 | Ohno | 179/170 R |
| 4,071,709 | 1/1978 | Lee et al. | 179/18 HB |
| 4,075,430 | 2/1978 | Reines | 179/18 J |
| 4,152,670 | 5/1979 | Rimondini et al. | 179/18 HB X |
| 4,161,633 | 7/1979 | Treiber | 179/170.2 |
| 4,174,467 | 11/1979 | Ferrieu | 179/18 HB |
| 4,192,975 | 3/1980 | Brockman | 179/77 |
| 4,211,896 | 7/1980 | Ferrieu | 179/18 FA |
| 4,213,014 | 7/1980 | Luder | 179/170.2 |
| 4,220,826 | 9/1980 | Kiss | 179/51 AA |
| 4,254,305 | 3/1981 | Treiber | 179/16 F |
| 4,284,854 | 8/1981 | Hayward et al. | 179/84 |

OTHER PUBLICATIONS

"A Digital Exho Suppressor for Satellite Circuits", E. Fariello, IEEE Transactions on Communications, Dec. 1972, pp. 1176-1181, (179-170.2).

"Introduction, Interfacing and Signalling Aspects of Digital Techniques in the Local Network," Mosch and Brockman, Proceedings of the 1978 International Zurich Seminar on Digital Communications, IEEE Catalog No. 78CH1325-0 Asst., pp. D5.1-D5.5.

Mussman, H. E., Smith, D. P., "Design Techniques which Reduce the Size and Power of the Subscriber Interface to a Local Exchange".

IEEE Proceedings, 1978 International Zurich Seminar on Digital Communications, Digital Transmission and Switching in Local Networks, Mar. 7-9, 1978, Zurich/-Switzerland, pp. B1.1-B1.6

Primary Examiner—Thomas W. Brown
Attorney, Agent, or Firm—P. Visserman

[57] ABSTRACT

A telephone switching system is disclosed which includes a digitally controllable multifunction signaling circuit responsive to commands from a central processor to generate or to receive subscriber line pulse signals of amplitude and duration specified by the processor commands. A bridge switch amplifier arrangement having an essentially constant voltage input signal and pulse width modulated control, is used to provide a substantially constant amplitude output signal. A two-stage access switch allows the signaling circuit to be time-shared among groups of subscriber lines.

13 Claims, 7 Drawing Figures

COMMUNICATION SYSTEM SIGNALING CIRCUIT

BACKGROUND OF THE INVENTION

The invention relates to communication switching systems and more specifically to service circuits used in communication switching systems for the generation and detection of communication signals.

PRIOR ART

In order to switch voice or data signals or the like, a communication switching system must be adapted to provide signaling pulses and to respond to signaling pulses. Specifically, in telephone systems, the central office must provide ringing and other signals to subscriber stations, provide interoffice signaling, and detect dial pulses and other signal pulses. A typical prior art system is described in the article entitled "No. 1 Electronic Switching System," *The Bell System Technical Journal,* Vol. 43, No. 5, September, 1964. Such a telephone switching system generally comprises a central processor and a switching network to which the system's subscriber lines, trunks to other offices, and a variety of service circuits are connected. A service circuit generally provides one function, such as coin control, digit transmission, digit reception, ringing, tone application, or testing. When a line or trunk requires one of the aforementioned services, a connection is made to an available service circuit via the switching network. This connection is established by means of command signals from the central processor to the network and the selected service circuit.

In modern telecommunication systems, a large variety of control signals may have to be generated. To provide a custom built circuit for each need is expensive, and tends to become impractical in a versatile system. Furthermore, certain high voltage and high current signals, such as the standard ringing signals, often cannot be transmitted through modern switching networks using solid state crosspoints. Prior art systems have used separate switch arrangements to bypass the switching network. However, where a large variety of signals is desired, an elaborate separate switch is required to accommodate the variety of signal sources. The burden resulting from such requirements has been eased in some existing systems by designating certain lines as equipped to handle special signaling. In a system wherein subscriber signaling requirements change rapidly, however, the use of designated lines becomes burdensome and expensive.

SUMMARY OF THE INVENTION

In accordance with this invention, a processor controlled service circuit comprises a signaling circuit which provides a variety of signal pulses in response to digital processor commands which define the characteristics of the pulse to be produced. A single signaling circuit may be connected to several different subscriber lines on a time-shared basis, through a switching matrix, providing a different signal at each connected line. In accordance with one specific embodiment of the invention, the signaling circuit comprises a switching amplifier responsive to the low level amplifier input signals to provide output signals of a level and duration specified by the computer commands. The amplifier advantageously comprises a bridge switch which receives a constant voltage input signal and generates an amplifier output signal which is substantially independent of the amplifier load. The amplitude and frequency of the amplifier output signal are determined by the duty cycle of the bridge switch which is controlled by the amplifier input signals.

Further, a signaling circuit in accordance with this invention may comprise detector circuitry responsive to processor commands to detect the presence of signals occurring on subscriber lines and to generate detector output signals only when the detected signals meet signal characteristics specified by the processor commands. A sensing circuit senses the presence of signals and a plurality of timing circuits and comparator circuits which detect the presence of signals having the characteristics defined by processor commands.

Advantageously, in accordance with my invention, one signaling circuit is used to generate a plurality of different types of signals, thereby avoiding the necessity of providing a separate signal generator for each type of signal. This is of particular significance in small offices or switching subsystems located remote from a central office, in both initial cost and electrical power savings.

Further, in accordance with this invention, all types of signals are made available to any subscriber line. Advantageously, this arrangement avoids the need for designation of specific lines for special signaling, thereby allowing for more efficient use of subscriber line terminations in the central office.

DETAILED DESCRIPTION

Figure 1:
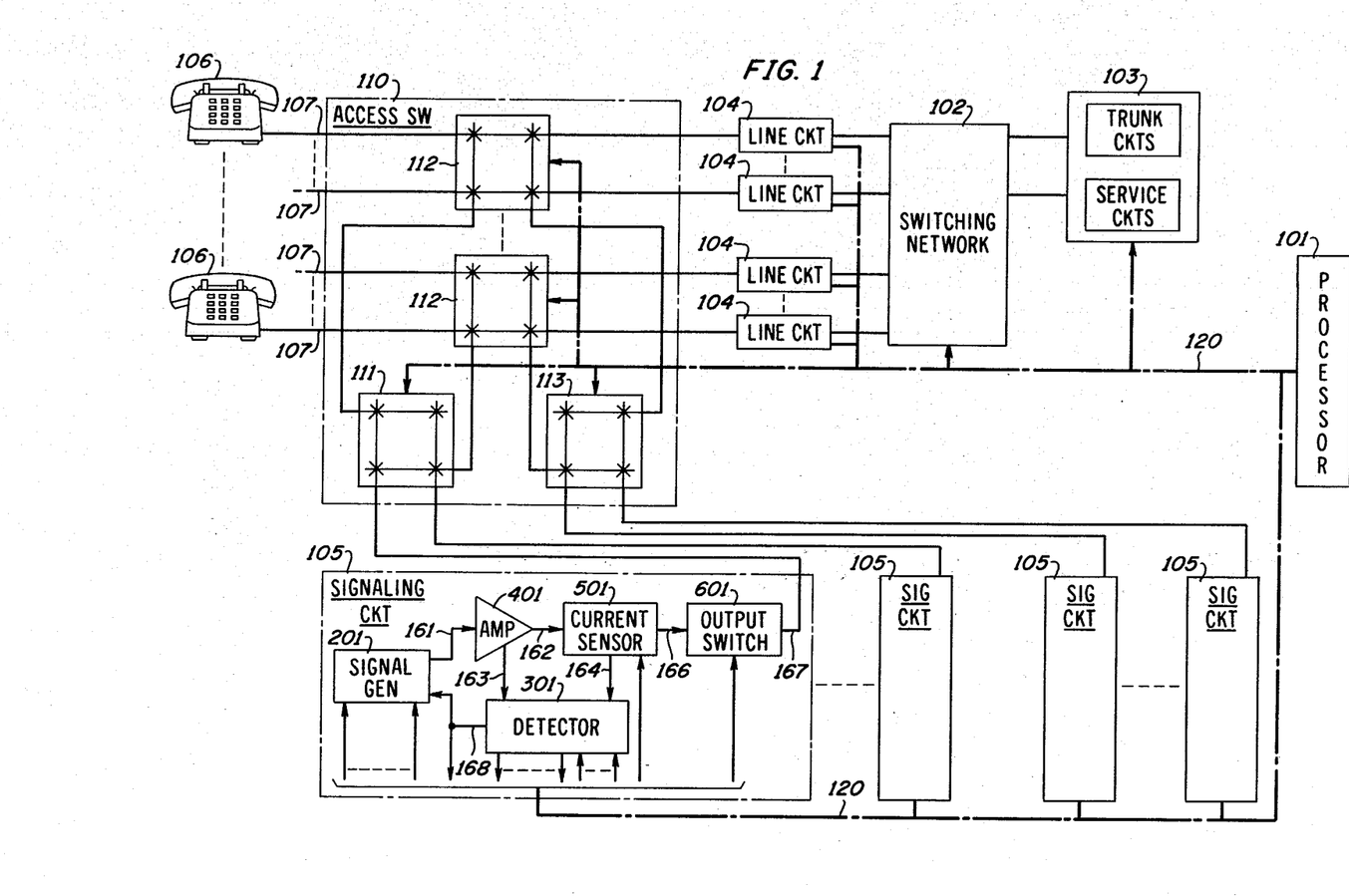
FIG. 1 is a block diagram representation of a telephone central office incorporating a plurality of communications signaling circuits in accordance with the invention.

FIG. 1 represents an illustrative telephone switching system incorporating signaling circuits in accordance with the invention. The switching system comprises a processor 101, a switching network 102, an arrangement of standard telephone trunk circuits and telephone service circuits 103 connected to one side of the switching network, and a plurality of standard telephone line circuits 104 connected to the other side of the switching network. Additionally, the illustrative system comprises a plurality of signaling circuits 105 connectible to the line circuits 104 and subscriber sets 106 via a multistage network 110, which comprises first stage switches 111, 113 and second stage switches 112. The processor 101, the switching network 102, the trunk and service circuit arrangement 103 and the line circuits 104 represent, in a basic form, a known telephone switching system. One switching system having such units and generally interconnected as shown in FIG. 1, described in the article entitled "No. 1 Electronic Switching System," supra. In the illustrative system of FIG. 1 signaling circuits, each adapted to generate a variety of analog signals to be transmitted to subscriber sets 106, are connected to the subscriber lines by means of a two-stage network 110. The network 110 may comprise a single first stage switch or a plurality of first stage switches. When multiple first stage switches are used, each second stage switch can be connected to several independent signaling circuits through independent first stage switches, thereby increasing reliability of the system. For the purposes of this description, it is assumed that the network 110 comprises two first stage switches 111 and 113 and several second stage switches 112. A plurality of signaling circuits 105 may be connected to each of these first stage switches, and each of the second stage switches 112 may be connected to a plurality of subscriber sets 106 via subscriber lines 107. The signaling circuit in accordance with this invention is controllable from the processor 101 to provide signals of varying voltage levels and frequencies at different times. By processor control of the switching network 110 and the signaling circuits 105, a single signaling circuit may be time shared among several lines to provide different signals on each of the lines. For example, one of the signaling circuits 105 may be used to apply a ringing signal to a first line during the active ringing period and to apply other signals to other lines during the silent period of the ringing signal of the first line.

The processor 101 may be any processor adapted to control an electronic switching system. Several such processors are known and have been described in the literature. One such processor is described in the article entitled "No. 1 Electronic Switching System" (supra). The processor communicates with the various circuits such as the trunk and service circuit arrangement 103, the switching network 102, and the switches 111, 112, 113, the line circuits 104, as well as the signaling circuits 105 by means of a communications bus 120. The specifics of the control of circuits of this type by the processor are well known in the art. Similarly, the trunk and service circuits of the arrangement 103, the switching network 102, the line circuits 104, are well known and are not described herein in detail. The switches 111, 112, 113, may comprise relays. It will be understood that the switches 111, 112, and 113 represented symbolicly in FIG. 1, include the necessary control circuitry to be able to be operated in accordance with specific processor commands. Line circuits 104 will include cutoff circuits to allow the line circuits to be isolated from subscriber lines 107 under control of processor 101, when signaling is applied via switches 112.

Each of the signaling circuits 105 is adapted to respond to command signals from the processor 101, in the form of digital control signals transmitted via the bus 120, to generate an output signal specified by the commands. In this illustrative embodiment, each of the signaling circuits 105 comprises a signal generator 201 which responds to processor commands to provide input signals for amplifier 401. Further, each signaling circuit 105 includes a current sensor 501 which is used in conjunction with detector 301 to detect signals defined by processor commands, and an output switch 601 which is responsive to processor commands to provide a variety of impedances in the output path.

Figure 2:
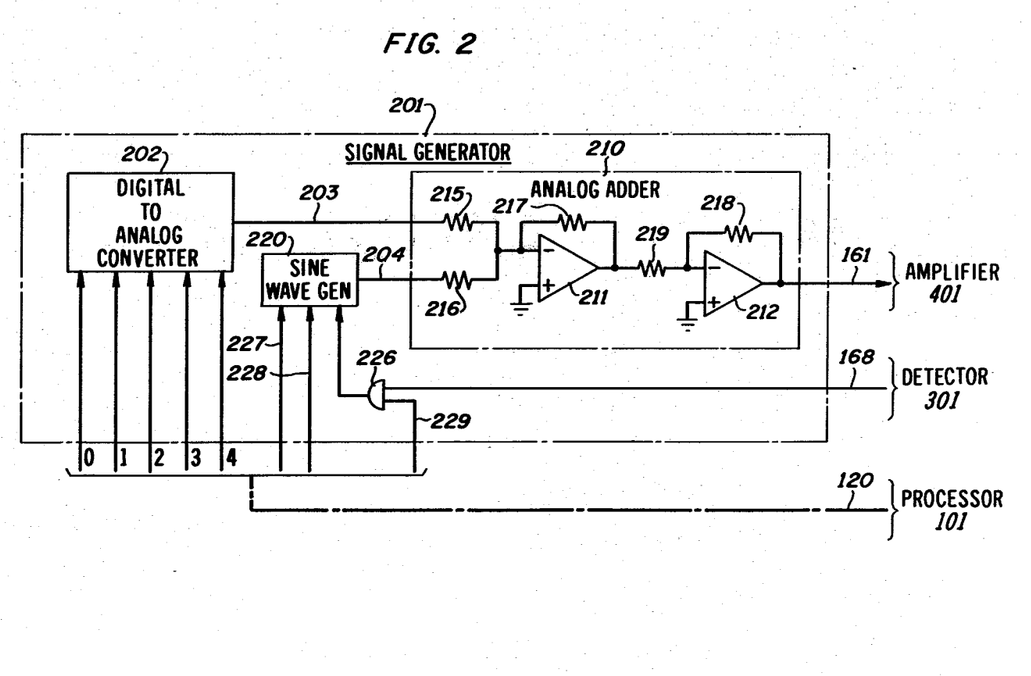
FIG. 2 shows an illustrative signal generator for use in the signaling circuits depicted in FIG. 1.

FIG. 2 represents in further detail the signal generator 201 of the signaling circuit 105, which comprises essentially, a digital-to-analog converter 202, a sine-wave generator 220 and an analog adder 210. The adder combines a constant voltage level signal from converter 202 with a sine-wave signal from generator 220 to generate an amplifier input signal comprising a sine-wave signal osicllating about the voltage level defined by converter 202. The digital-to-analog converter 202 is responsive to the simultaneous application of a number of signals on its input terminals 0 through 4 to generate an output voltage signal having a level corresponding to the numerical value defined by the combination of signals applied to its input terminals. Since 32 different levels may be defined by means of a 5-bit binary word, the digital-to-analog converter 202 having five input terminals is capable of providing output voltage signals at 32 different levels. Digital-to-analog converters which will perform these functions are well known in the art and are commercially available. The output signals developed by the digital-to-analog converter 202 are applied to the analog adder circuit 210 via conductor 203.

Figure 3:
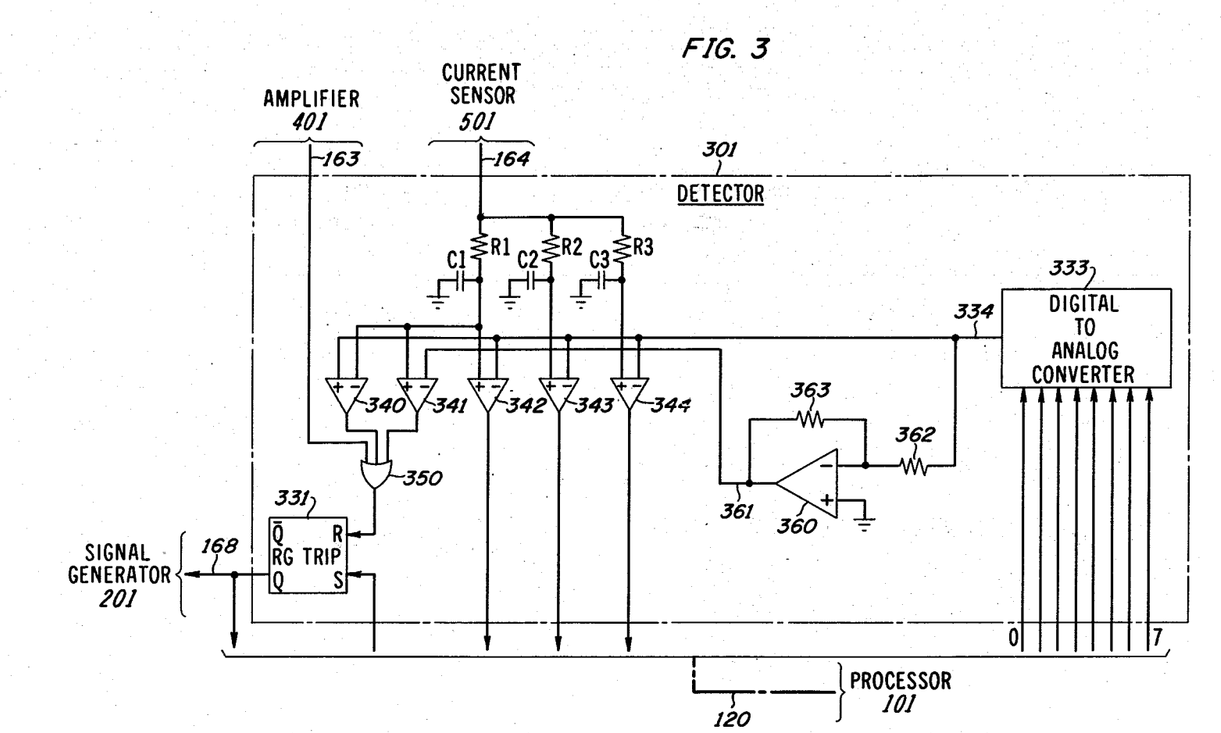
FIG. 3 shows an illustrative detector circuit for use in the signaling circuits of FIG. 1.

The analog adder circuit 210 receives a further input signal from sine-wave generator 220 via the conductor 204. The sine-wave generator 220 may be any standard sine-wave generator which has frequency control and level control and which can be enabled externally. Such sine-wave generators are well known in the art and need no further description. The sine-wave generator 220 may, for example, have a frequency control input via conductor 227, an amplitude control input via conductor 228 and an enable input from AND gate 226. The frequency control and level control inputs will control the sine-wave generator to provide at least two frequencies and two levels of amplitude. The AND gate 226 is controlled by a processor control signal received on conductor 229 and a detector output signal on conductor 168. As will be described later herein, the detector 301, shown in FIG. 3, is designed to detect signals on the subscriber lines. The ring trip flip-flop 331 which is part of the detector circuit is set by a control signal received on bus 120. Conductor 168 is connected to the Q output terminal of flip-flop 331 and to one of the input terminals of AND gate 226. Thus, AND gate 226 will enable sine-wave generator 220 as long as flip-flop 331 is set and the processor control signal is present on conductor 229. Flip-flop 331 is reset by detector 301 when the off-hook condition is detected on the subscriber line to which ringing is applied. The off-hook condition requires that ringing be terminated and sine-wave generator 220 is inhibited via AND gate 226 when flip-flop 331 is reset. Under this condition, the amplifier input signal generated by the analog adder 210 will consist only of a constant level signal which will cause the amplifier 401 to provide a constant level signal to the subscriber line instead of the sine-wave ringing signal.

Analog adder 210 comprises essentially two operational amplifiers, 211 and 212. The resistors 215, 216 and 217 are connected together in a summing junction at one input to operational amplifier 211 which generates an output signal representative of the sum of the currents flowing in conductors 203 and 204. The output signal is applied to operational amplifier 212, via resistor 219, for amplification. The resistor 218 is a feedback resistor for operational amplifier 212. The values of the various resistors 215 through 219 may be selected as a matter of design choice in a well-known fashion and will depend upon the level of signals occurring on the conductors 203 and 204 and the level of the output signal desired. Any summing circuit could be used for this purpose with or without amplification. The output signal of the analog adder 210 is connected to amplifier 401 which will be discussed later herein with respect to FIG. 4.

FIG. 3 shows circuit details of the detector circuit 301, which receives an input signal from the current sensor 501. This circuit comprises several RC timing circuits (R1C1, R2C2, R3C3) to generate output signals corresponding to sensed signals of varying durations. It is well known that an RC circuit, arranged substantially as shown in the drawing, introduces essentially a time delay in an applied pulse and absorbs pulses which have a duration of less than a specified period, as defined by the time constant of the RC circuit. The values of the RC combinations may be chosen such that only pulses of greater than specified duration are applied to the comparator circuits of the detector 230. For example, the values of R1 and C1 may be chosen such that only pulses having a duration of greater than 200 milliseconds will reach a selected voltage level at the output of the filter circuit. Similarly, the values of R2 and C2 may be chosen such that only pulses of greater than 50 millisecond duration are passed and the values of R3 and C3 may be chosen such that only pulses of greater than 5 millisecond duration are passed.

The detector 301 further comprises a number of operational amplifiers 340 through 344 which are used as comparator circuits. These comparators receive one input signal from one of the RC circuits and another input signal from a variable source such as the digital-to-analog converter 333. Such converters are well known in the art. The converter has input terminals 0 through 7, and an 8-bit data word applied to the input terminals will cause the converter to generate an output signal having any one of 256 different voltage levels, as defined by the data word. Operational amplifier circuit 360 is used as an inverter to generate voltage level signals of reverse polarity. Resistors 362 and 363 are used with the inverter circuit in a well-known manner.

It will be apparent that by selection of the appropriate level to be supplied by converter 333, and a proper selection of values for R1C1, R2C2, and R3C3, signals of a variety of voltage levels and a variety of durations may be detected by means of comparators 340 through 344. The circuits R1C1, R2C2 and R3C3 are connected to the plus terminal of comparators 342, 343 and 344, respectively. The minus terminals of each of these comparators are connected to converter 333. Therefore, comparators 342, 343 and 344 will generate an output signal when the level of the signal at the connected RC circuit exceeds the level of the signal generated by converter 333 on conductor 334. The comparator output signals are transmitted to processor 101 via cable 120.

The ring trip flip-flop 331, as mentioned earlier herein, is used to disable the sine-wave generator 220 in the event that an off-hook condition is detected on the subscriber line to which ringing is applied. The off-hook condition on the subscriber line is evidenced on the line by a change from a no current or very low current condition to a relatively high current flow which is sensed by the current sensor 501. The output of the current sensor is applied via conductor 164 to the R1C1 combination of the detector 301. The output of this RC circuit is applied to the minus terminal of comparator 340 and to the plus terminal of comparator 341. These comparators are connected to the R (reset) terminal of flip-flop 331 through OR gate 350. Conductor 334 connects converter 333 to the plus terminal of comparator 340 and conductor 361 connects inverter 360 to the minus terminal of comparator 341. The output level of the converter 333, and hence of the inverter 360, may be set to a desired value by processor 101 via cable 120. This level is applied to the comparators and when the amplitude of the signal at capacitor C1 reaches an absolute value greater than that of the signals applied to the comparators, flip-flop 331 will be reset via OR gate 350.

Figure 4:
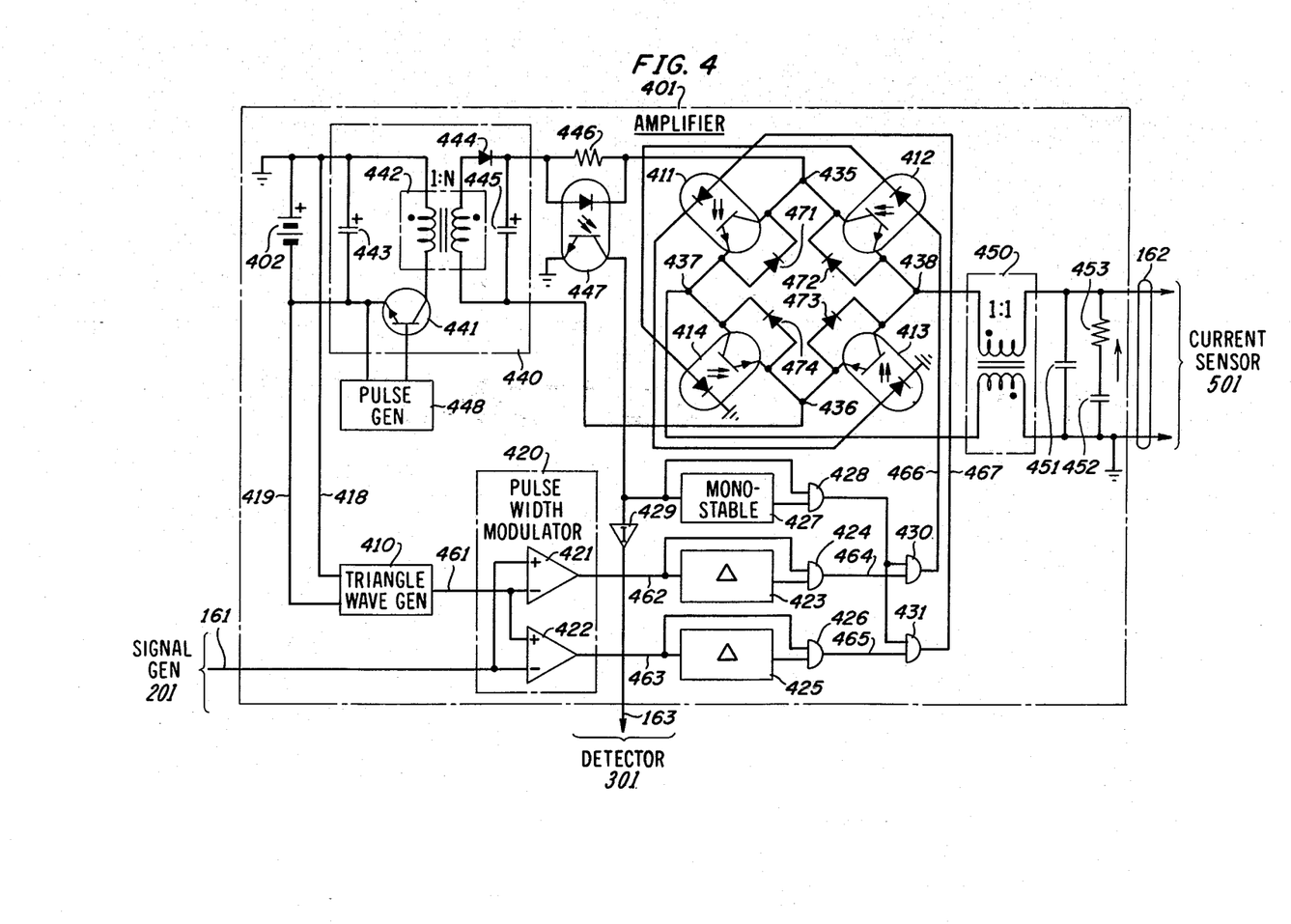
FIG. 4 shows an illustrative amplifier circuit for use in the signaling circuits of FIG. 1.

FIG. 4 is a representation of a switching mode amplifier in accordance with the invention. The amplifier comprises a bridge switch consisting of four opto-isolator switches 411, 412, 413, and 414. A substantially constant voltage is supplied to bridge input terminals 435, 436 by means of a feed-forward converter circuit 440. Transformer 442 together with switch 441, capacitors 443 and 445, and diode 444 form the converter. The transformer has a 1:N turns ratio where N may, for example, be 4. The transformer supplies current to the bridge through diode 444 by normal transformer action when current flows in the transformer primary. The current flow through the primary of transformer 442 is controlled by means of a transistor switch 441 under control of a pulse generator 448. The pulse generator 448 is operated at a fixed frequency, for example, 20 kilohertz. Since the transistor switch is essentially an on-off switch, the current in the primary coil of the transformer 442 consists essentially of a series of pulses which are smoothed by the presence of the capacitor 443. Diode 444 and capacitor 445 are used in combination as a rectifier circuit. This converter arrangement supplies a substantially constant voltage to nodes 435 and 436 of the amplifier bridge, independent of any amplifier input signal or load condition.

The switches 411, 412, 413 and 414 are operated under control of a pulse width modulator 420. The pulse width modulator 420 receives input signals from a triangle wave signal generator 410 and an input signal generated by the signal generator 201. The triangle generator 410 is adapted to generate a triangle waveform the amplitude of which is a function of the value of the input voltage, in this case the value of the battery 402. The triangle pulse generator is described in greater detail later herein with reference to FIG. 7. The triangular wave output signal of generator 410 is modified by the amplifier input signal occurring on conductor 161, which may be any waveform, by means of the pulse width modulator 420. Output signals of the modulator form the control pulses for controlling transistors 411 through 414 of the amplifier bridge. The pulse width modulator 420 comprises operational amplifiers 421 and 422, which are used as comparators and are adapted to generate a positive output pulse as long as the voltage level of the signal applied to the positive input terminal exceeds that applied to the negative input terminal.

As shown in FIG. 4, conductor 161 is connected to the positive terminal of comparator 421 and to the negative input terminal of comparator 422, and conductor 461 connects the triangle wave generator 410 to the negative input terminal of comparator 421 and the positive input terminal of comparator 422. Thus, comparator 421 will generate a positive output pulse during the period that the level of the input signal on conductor 161 exceeds the level of the triangle waveform. Conversely, the comparator 422 will generate an output pulse during the period that the level of the triangular waveform exceeds the level of the input signal on conductor 161. These output pulses are used to control the switching of the amplifier bridge. They are applied to the bridge switches by means of delay circuits 423 and 425 and AND gates 424, 426, 430 and 431. The delay circuits 423 and 425 and AND gates 424 and 426 are provided to avoid overlap between the two sets of switches 411, 413 and 412, 414, which might otherwise occur due to the inherent turn-off delay of the switches. The delay circuits cause the leading edge of each control pulse to be delayed by a period of time sufficient to avoid the overlap.

AND gates 430 and 431 are used to control activation of the bridge and allow operation of the bridge to be inhibited in the event of an overcurrent condition. To detect an overcurrent condition, a current sensing circuit, comprising resistor 446 and opto-isolator switch 447, has been provided. An excessive current or overcurrent condition is defined as the condition in which current flowing through the resistor 446 creates a voltage drop of sufficient magnitude to cause the opto-isolator switch 447 to be activated. It will be understood that the value of the resistor 446 will depend upon the level of current that is acceptable in the amplifier, which is a function of the parameters of the actual devices used in the circuit. The switch 447 is connected to a monostable circuit 427, AND gate 428 as well as inverter 429. When the switch 447 is activated, the input terminal of the monostable circuit 427 and one input terminal of the AND gate 428 will be essentially connected to ground through switch 447 causing the AND gate 428 to become inhibited immediately. AND gate 428 is connected to AND gates 430 and 431 and serves to inhibit AND gates 430 and 431, thereby preventing the application of control pulses to the amplifier bridge. The monostable circuit 427 is specifically provided to assure that the inhibit pulse exists for at least a minimum period of time, preventing rapid oscillation of the amplifier bridge in the event of an overcurrent condition. The opto-isolator switch 447 is connected through inverter 429 to the OR gate 350 via conductor 163 to reset the ring trip flip-flop 331 (FIG. 3), thereby inhibiting the signal generator 201 and terminating ringing in case of an overcurrent condition.

The potential produced by the converter circuit 440 across the bridge circuit input terminals 435 and 436 may be applied to bridge output terminals 437 and 438, in either the forward or reverse direction, under control of pulses generated from pulse width modulator 420. Under control of pulses on conductor 466, opto-isolator switches 412 and 414 are activated to cause the input potential to be applied in what is designated as the forward direction, establishing conductive paths between nodes 435 and 438, and nodes 436 and 437. By means of pulses applied on conductor 467, opto-isolator switches 411 and 413 are activated establishing conductive paths between nodes 435 and 437 and nodes 436 and 438. In this mode the potential is applied in the reverse direction making the polarity applied across output terminals 437 and 438 opposite to that applied in the forward direction.

The opto-isolator switches 411 through 414 each comprise a light emitting diode and a high voltage optically controlled transistor. The operation and construction of these switches is well understood by those skilled in the art. In addition to an opto-isolator switch, each leg of the amplifier bridge comprises a diode 471, 472, 473, 474). These diodes are provided to carry current in the direction opposite to that conducted by the associated opto-isolator switch. Current will flow either through the diode or through the switch, depending on load conditions.

As explained in preceding paragraphs, digital-to-analog converter 202 and sine-wave generator 220 are responsive to digital control signals from processor 101 to generate output signals which are combined to produce an amplifier input signal on conductor 161. This signal is applied to pulse width modulator 420, together with a triangle wave to generate bridge circuit control signals on conductors 466 and 467. This analog circuitry could be eliminated and the combining of analog signals could be avoided by computing the appropriate bridge control signals digitally in processor 101. Such signals might be applied to conductors 466 and 467 directly or by means of pulse generators controlled by processor 101.

The inductive circuit 450 shown in FIG. 4 is essentially a pulse transformer with a finite inductance used as a filter. By selecting a transformer having a 1-to-1 turns ratio and having the direction of mutual inductance as defined by the dot convention shown on the drawing, the transformer action is utilized to provide a strong inductive filter. The capacitor 451 and the resistor 453 in combination with capacitor 452 provide capacitive filtering. With this filter arrangement, the amplifier may be used to drive a capacitive load or an inductive load with high efficiency.

Figure 5:
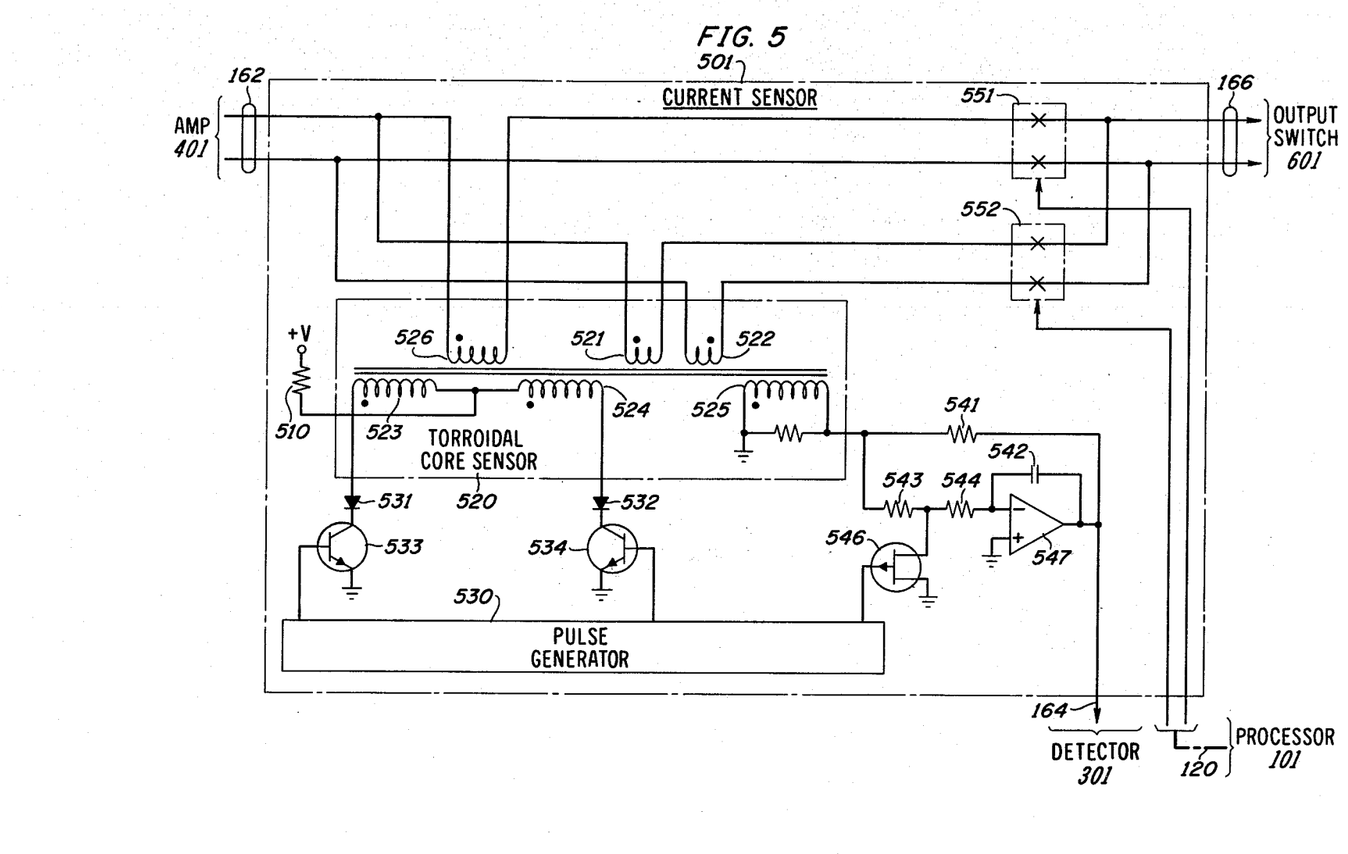
FIG. 5 shows an illustrative current sensor for use in the signaling circuits of FIG. 1.

The current sensor 501 is shown in greater detail in FIG. 5. A sensor of this general type is disclosed in copending application, Ser. No. 061,261, filed July 27, 1979, now U.S. Pat. No. 4,278,938, issued July 14, 1981. The current sensor may operate in one of two modes to detect either the so-called single-ended current or the differential current in the subscriber line to which it is connected. Relay switches 551 and 552 are provided to selectively connect a subscriber line to the windings of toroidal core sensor 520. Switches 551 and 552 may, for example, be relay switches which are normally opened and which are closed when control signals are applied to them via bus 120. Switch 551 will be operated when single-ended current is to be detected, causing current in one leg of the connecting path to flow through winding 526 of core sensor 520 and providing a direct connection in the return leg of the current path. When differential current is to be detected, switch 552 is operated causing current in one leg of the current path to flow through winding 521 and causing current in the return leg of the current path to flow through winding 522.

The core sensor 520 may comprise a magnetic core around which windings 521 through 526 have been wound. As indicated earlier, windings 521, 522, and 526 are connectible to a subscriber line. Windings 523 and 524 are control windings and current flow through the windings from a power supply and through a series resistance 510 is controlled by transistors 533 and 534. Diodes 531 and 532 are provided in the current path to avoid reverse current flow. The transistors 533 and 534 are controlled by means of pulse generator 530 in such a manner as to cause current flow, alternately, in coil 523 and coil 524. Coil 525 is a sense coil sensing the change in flux in the core. When no change in flux is induced in the core from the subscriber line on windings 521, 522 or 526, the sense winding 525 will sense only the flux induced by the control windings 523 and 524 and produce output voltages of equal amplitude but opposite polarity. In the event that a change in flux is produced in the core from the subscriber line, the sense winding 525 will detect a flux which is the summation of the line flux and control flux in one instance and which is the difference between the line flux and the control flux in another instance, since the control windings produce flux of equal magnitude but in opposite directions. The output voltage produced by the sense winding 525 is applied to an integrator 547 through resistors 543 and 544. The output signals of the sense winding are accumulatively and algebraically added by the integrator in cooperation with the capacitor 542. Resistor 541 provides a feedback signal to sense winding 525. A transistor 546 is provided to prevent the sense winding output signal from reaching the integrator during the period that the output of the sense winding is not meaningful. The field effect transistor 546 is controlled from the pulse generator 530 in conjunction with the control of transistors 533 and 534 to prevent the integrator from responding to undesired signals during the switching of the control windings 523 and 524.

Figure 6:
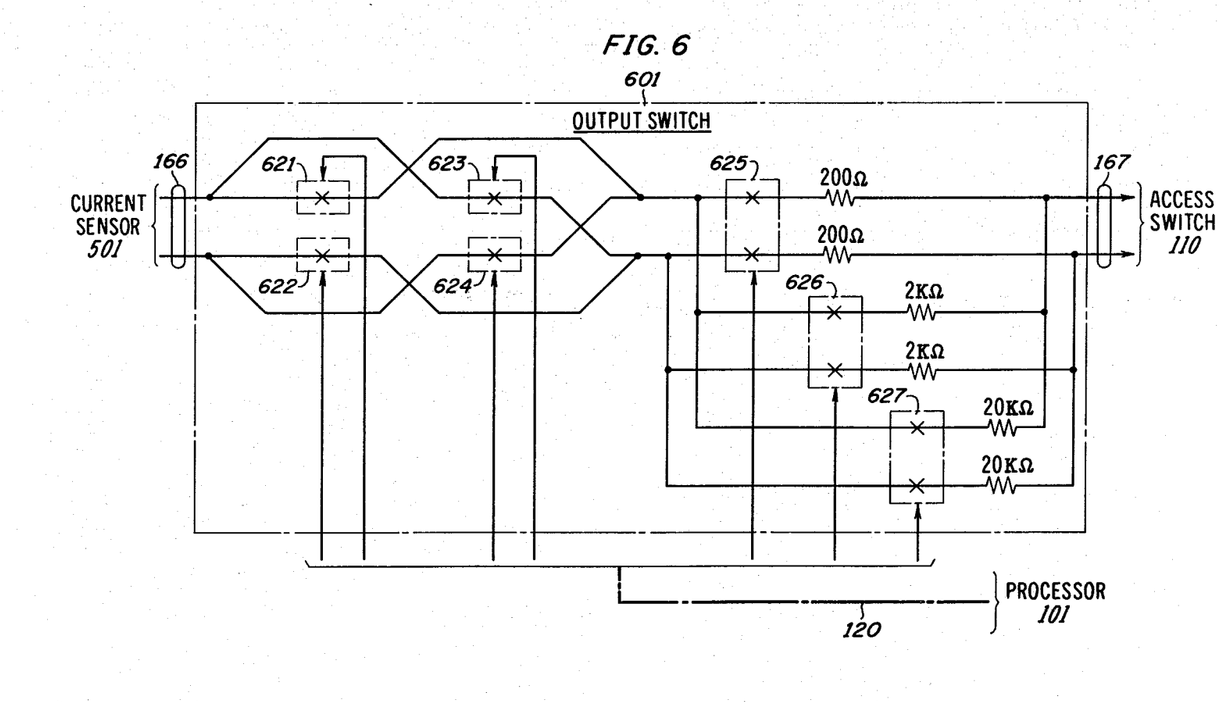
FIG. 6 shows an illustrative output switch for the signaling circuits of FIG. 1.

Output switch 601 is shown in greater detail in FIG. 6. Several different connections may be established between the input and output conductors of the switch by operation of switches 621 through 624. Additionally, switches 625, 626 and 627 are provided to allow varying impedances to be introduced into the load path. Operation of switches 625, for example, inserts a series impedance of 200 ohms; operation of switches 626 inserts an impedance of 2,000 ohms in each leg of the circuit connected to the load via conductors 167.

Conductors 167 are shown in FIG. 1 as a single conductor but are understood to comprise two conductors as shown in FIG. 6. The crosspoint switches indicated in FIG. 1 in the switches 111, 112 and 113 are in a practical system, dual-crosspoint switches connecting to two-wire subscriber line 107. The two wires of the subscriber line representing the tip and ring wires are well known in the standard telephone system. Accordingly, the conductors 167 shown in FIG. 6 may be thought of as being connected to the tip and ring leads of the subscriber line 107 via the switching arrangement 110.

Figure 7:
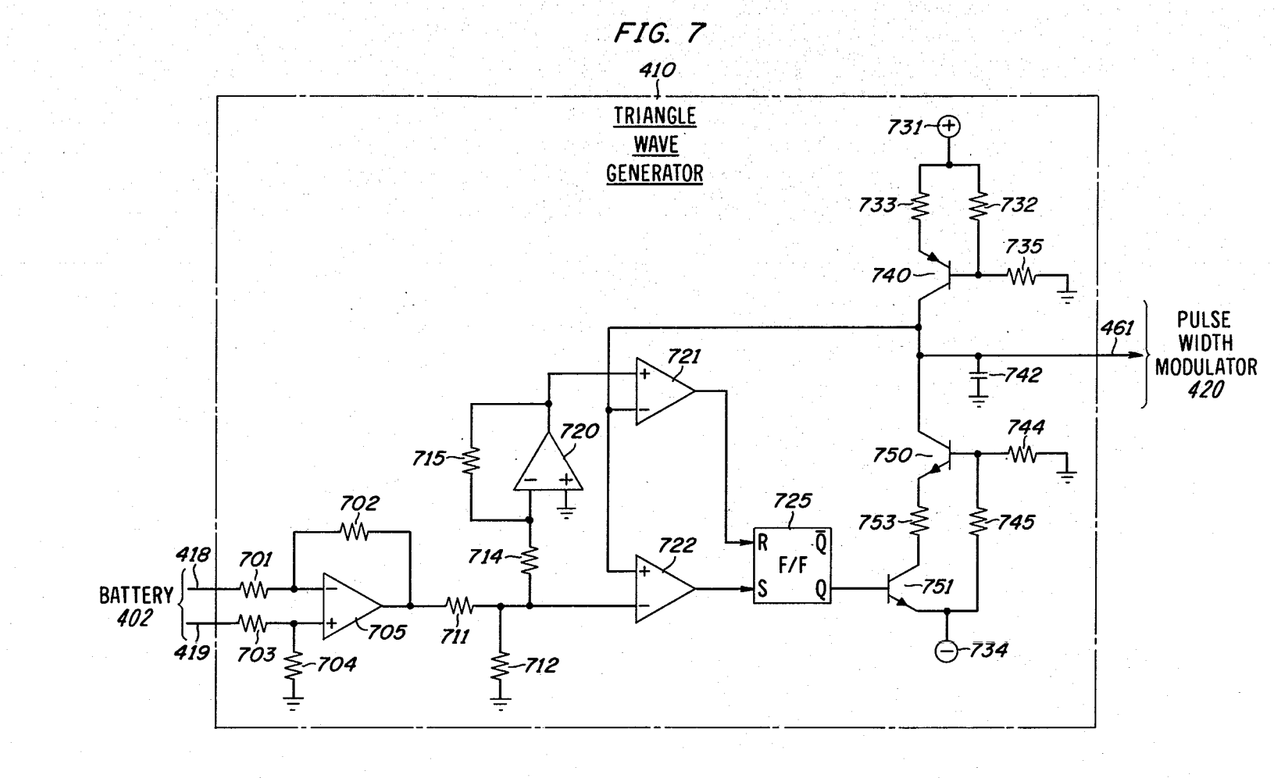
FIG. 7 shows a triangle wave generator for use in the amplifier of FIG. 4.

The triangle wave signal generator 410, as shown in FIG. 4, is shown in greater detail in FIG. 7. The generator is designed to compensate for changes in voltage level of battery 402 and to control the amplifier bridge in such a manner that the amplitude of the amplifier output signal is independent of changes in battery voltage. The input voltage applied across bridge terminals 435 and 436 is constant except for variations in battery voltage. A change in battery voltage is detected in generator 410 and results in a change in amplitude of the triangle wave signal. As described earlier herein, this signal is combined with the amplifier input signal in pulse width modulator circuit 420, to control the operation of bridge switches 411 through 414. Accordingly, a change in amplitude of the triangle wave signal results in a change in the duty cycle of the bridge and, hence, in the amplitude of the signals at the output terminals (437, 438) relative to the signal at the bridge input terminals (435, 436). For example, a decrease in battery voltage will result in a decrease of bridge input voltage and in a decrease in amplitude of the triangle signal, which is equivalent to an increase in the amplifier input signal on conductor 161 at the modulator circuit 420. Consequently, the amplitude of the bridge output signal will be increased relative to the decreased bridge input voltage to compensate for the decrease in input voltage.

The generator 410 comprises a double-ended to single-ended converter consisting of the operational amplifier 705, in conjunction with resistors 701, 702, 703, 704. One input terminal of the operational amplifier is connected to the grounded positive battery terminal via conductor 418 and resistor 701, and the other is connected to the negative battery terminal via conductor 419 and resistor 703, thereby being connected essentially across the battery 402. When connected in this manner, the operational amplifier 705 will provide an output signal which varies with a variation in battery output voltage. By means of the operational amplifier 705 and the associated resistors, an output signal is applied across the voltage divider comprising resistor 711 and 712 which is proportional to the battery voltage. The circuit may, for example, be selected such that with a 48 volt battery, a potential of 3 volts is applied across the resistor 712. The signal is inverted by means of the inverter circuit comprising operational amplifier 720 and the associated resistors 714 and 715. The positive 3 volt signal and the inverse thereof are applied to a pair of operational amplifiers 721 and 722, which are used as comparators to compare the output signal generated on conductor 461 with the positive 3 volt and inverse 3 volt signals.

The circuit for generating the output signal on conductor 461 comprises essentially a current source consisting of transistor 740 and associated resistors 732, 733, and 735 which are connected to a power supply source 731. Resistors 732 and 735 are used to obtain a bias for the transistor 740 causing the transistor to be in the conductive state at all times. A circuit comprising transistors 750 and 751 and associated resistors 744, 745, and 753 controls the level of the signal on conductor 461. This circuit is controlled from flip-flop 725, which is set and reset by comparators 722 and 721, respectively. When transistor 751 is in a nonconducting state, the current flowing through transistor 740 is used to charge capacitor 742 which is connected between the output conductor 461 and ground causing the voltage on conductor 461 to rise providing an output signal having a positive slope. When the signal on conductor 461 exceeds the positive 3 volt level of the input signal, comparator 722 will produce an output signal setting flip-flop 725. This flip-flop, when in its set state, causes transistor 751 to conduct, causing current no flow in the direction of the negative voltage source 734.

It is apparent that any change in the +3 volt signal will result in a change in amplitude of the output signal on conductor 461. The parameters of the circuit consisting of transistors 740, 750, and 751 and their connected resistors should be chosen such that the current flow through transistor 751 in the conducting state is approximately twice the amount of current flow through transistor 740. In this manner, the capacitor 742 will be discharged when the transistor 751 is in the conducting state, producing a signal having a negative slope. When the potential of capacitor 742, and hence, of conductor 461, drops below −3 volts, comparator 721 will generate an output signal resetting flip-flop 725 thereby cutting off transistor 751. It will be understood that the value of the 3 volts for the input signal is arbitrary and any other desired value may be produced by the proper selection of circuit elements. The potential of voltage sources 731 and 734 must be greater than the peak value of the wave to be generated on the conductor 461 and preferably will be substantially greater to more nearly approximate a triangle wave signal on conductor 461.

It is to be understood that the above-described embodiment is merely illustrative of the principles of the invention; other arrangements may be devised by those skilled in the art without departing from the spirit and scope of the invention.

What is claimed is:

1. In a communication switching system comprising a plurality of subscriber lines, a circuit arrangement comprising a service circuit (105) and means (111, 112) for connecting said service circuit to said subscriber lines, characterized in that said service circuit comprises current sensing means (501) for generating a sensor output signal representative of the magnitude of current in a connected subscriber line, means (333) responsive to control signals defining a predetermined magnitude for generating a threshold signal having a magnitude corresponding to said predetermined magnitude, and comparator means (340, 341, 342, 343, 344) for generating an output signal when the magnitude of said sensor output signal is equal to or greater than the magnitude of said threshold signal.

2. The circuit arrangement in accordance with claim 1, characterized in that said service circuit further comprises amplifier means (401) and means (202, 220) responsive to additional control signals defining amplitude and waveshape for generating amplifier input signals corresponding to said additional control signals; said amplifier means being responsive to said input signals for applying to a connected subscriber line an output signal having the magnitude and waveshape defined by said additional control signals.

3. The circuit arrangement in accordance with claim 2, characterized in that said means for connecting comprises switch means (111, 113) having an input terminal connected to said service circuit and a plurality of output terminals each connected to a subscriber line, said switch means being responsive to switch control signals to selectively interconnect said input terminal and said output terminals, whereby said service circuit may be selectively connected to said lines on a time-shared basis.

4. A signaling circuit (105) connectible to subscriber lines in a communication switching system characterized in that said signaling circuit comprises: amplifier means (401) comprising a power source (402, 441, 442, 443, 444, 445) for providing a signal of a predetermined voltage level, a bridge circuit (411, 412, 413, 414) connected to said power source, control means (410, 420) responsive to an amplifier input signal for controlling said bridge circuit, and filter means (450), coupled to said bridge circuit, for providing an amplifier output signal having a waveshape and amplitude defined by said amplifier input signal; and means (201) for generating said amplifier input signal comprising digital-to-analog converter means (202) responsive to digital control signals to generate an analog output signal of an amplitude defined by said digital control signals, controllable waveform generating means (220) responsive to said digital control signals to generate a waveform signal of a frequency defined by said digital control signals, and analog adder means (210) connected to said digital-to-analog converter and said waveform generator for combining said analog output signal and said waveform signal to form said amplifier input signal; whereby the amplitude of said amplifier output signal is directly controlled by the duty cycle of said bridge circuit.

5. A signaling circuit (105) connectible to subscriber lines in a communication switching system characterized in that said signaling circuit comprises amplifier means (401) comprising: a power source (402, 441, 442, 443, 444, 445) for providing a signal of a predetermined voltage level; a bridge circuit (411, 412, 413, 414) connected to said power source; control means (410, 420) responsive to an amplifier input signal for controlling said bridge circuit; and filter means (450) for providing an amplifier output signal having a waveshape and amplitude defined by said amplifier input signal, said filter means comprising a first inductor coil connected to a first output terminal (438) of said bridge circuit and a second inductor coil connected to a second output terminal (437) of said bridge circuit, said inductor coils having a mutual inductance therebetween, said coils having an equal number of turns and being wound in the same direction with respect to current flowing from said first terminal into a connectible load and from a connectible load into said second terminal; whereby the amplitude of said amplifier output signal is directly controlled by the duty cycle of said bridge circuit.

6. A signaling circuit (105) connectible to subscriber lines in a communication switching system characterized in that said signaling circuit comprises amplifier means (401) comprising: a power source (402, 441, 442, 443, 444, 445) for providing a signal of a predetermined voltage level, a bridge circuit (411, 412, 413, 414) connected to said power source, control means (410, 420) responsive to an amplifier input signal for controlling said bridge circuit, filter means (450), coupled to said bridge circuit, for providing an amplifier output signal having a waveshape and amplitude defined by said amplifier input signal, and overcurrent detection means (446, 447) responsive to an overcurrent condition to generate an inhibit signal, said control means being responsive to said inhibit signal to inhibit the control of said bridge circuit whereby the amplitude of said amplifier output signal is directly controlled by the duty cycle of said bridge circuit.

7. The arrangement in accordance with claim 6 further characterized in that said signaling circuit comprises signal generator means (201) for generating said amplifier input signal and logic circuit means (226, 331, 350) responsive to said inhibit signal to inhibit said signal generator means.

8. A signaling circuit (105) connectible to subscriber lines in a communication switching system characterized in that said signaling circuit comprises: amplifier means (401) comprising a power source (402, 441, 442, 443, 444, 445) for providing a signal of a predetermined voltage level, a bridge circuit (411, 412, 413, 414) connected to said power source, control means (410, 420) responsive to an amplifier input signal for controlling said bridge circuit, and filter means (450), coupled to said bridge circuit, for providing an amplifier output signal having a waveshape and amplitude defined by said amplifier input signal; current sensing means (501) connectible to said subscriber lines for generating a detector signal representative of the magnitude of current in a subscriber line; means (333, 360) for generating a threshold signal; and comparator means (340, 341, 342, 343, 344) for comparing detector signals generated by said current sensing means and said threshold signal for generating a comparator output signal when the magnitude of said detector signal is equal to or exceeds the magnitude of said threshold signal; whereby the amplitude of said amplifier output signal is directly controlled by the duty cycle of said bridge circuit.

9. The arrangement in accordance with claim 8 further characterized in that said signaling circuit comprises signal generator means (201) for generating said amplifier input signal and logic circuit means (226, 331, 350) responsive to said comparator output signal to inhibit said signal generator means.

10. A signaling circuit (105) connectible to subscriber lines in a communication switching system characterized in that said signaling circuit comprises: amplifier means (401) comprising a power source (402, 441, 442, 443, 444, 445) for providing a signal of a predetermined voltage level, a bridge circuit (411, 412, 413, 414) connected to said power source, control means (410, 420) responsive to an amplifier input signal for controlling said bridge circuit, and filter means (450), coupled to said bridge circuit, for providing an amplifier output signal having a waveshape and amplitude defined by said amplifier input signal; and output switch means (601) responsive to digital control signals for selectively inserting impedances of differing values between the output terminals of said bridge circuit and said subscriber lines; whereby the amplitude of said amplifier output signal is directly controlled by the duty cycle of said bridge circuit.

11. A signaling circuit (105) connectible to subscriber lines in a communication switching system characterized in that said signaling circuit comprises amplifier means (401) comprising: a bridge circuit (411, 412, 413, 414) having input terminals (435, 436), a voltage source (402) for providing an output signal of a predetermined voltage level, a feed-forward transformer (442) having a primary winding connected to said voltage source and a secondary winding connected to said bridge circuit input terminals, switch means (441) for controlling periodic current flow in said primary winding at a constant rate, diode means (444) connected between a first terminal of said secondary winding and one of said bridge circuit input terminals, capacitor means (445) connected between said bridge circuit input terminals, control means (410, 420) responsive to an amplifier input signal for controlling said bridge circuit, and filter means (450), coupled to said bridge circuit, for providing an amplifier output signal having a waveshape and amplitude defined by said amplifier input signal, whereby the amplitude of said amplifier output signal is directly controlled by the duty cycle of said bridge circuit, and said transformer provides a signal of substantially constant voltage level to said bridge input terminals independent of the load connected to said bridge circuit.

12. A signaling circuit (105) connectible to subscriber lines in a communication switching system characterized in that said signaling circuit comprises amplifier means (401) comprising: a power source (402, 441, 442, 443, 444, 445) for providing a signal of a predetermined voltage level; a bridge circuit (411, 412, 413, 414) connected to said power source; control means (410, 420) responsive to an amplifier input signal for controlling said bridge circuit, said control means comprising a signal generator (410) for generating a triangle wave signal and a pulse width modulator circuit (420) responsive to said amplifier input signal and said triangle wave signal to control said bridge circuit; and filter means (450), coupled to said bridge circuit, for providing an amplifier output signal having a waveshape and amplitude defined by said amplifier input signal, the amplitude of said amplifier output signal being directly proportional to the amplitude of said amplifier input signal; whereby the amplitude of said amplifier output signal is directly controlled by the duty cycle of said bridge circuit.

13. A signaling circuit (105) connectible to subscriber lines in a communication switching system characterized in that said signaling circuit comprises amplifier means (401) comprising: a power source (402, 441, 442, 443, 444, 445) for providing a signal of a predetermined voltage level; a bridge circuit (411, 412, 413, 414) connected to said power source; control means (410, 420) responsive to an amplifier input signal for controlling said bridge circuit, said control means comprising means (410) responsive to change in voltage level of said signal provided by said power source to generate a control signal which varies in accordance with said change in voltage level, said control means being responsive to said control signal to control said bridge circuit to compensate for said change in voltage level; and filter means (450), coupled to said bridge circuit, for providing an amplifier output signal having a waveshape and amplitude defined by said amplifier input signal; whereby the amplitude of said amplifier output signal is directly controlled by the duty cycle of said bridge circuit, and the amplitude of said amplifier output signal is independent of changes in voltage level of said signal provided by said power source.

* * * * *